United States Patent
Bradley

(10) Patent No.: US 7,101,624 B2
(45) Date of Patent: Sep. 5, 2006

(54) LAMINATE ANTIOXIDANT FILM

(75) Inventor: James S. Bradley, Battle Creek, MI (US)

(73) Assignee: Cello-Foil Products, Inc., Battle Creek, MI (US)

( * ) Notice: Subject to any disclaimer, the term of this patent is extended or adjusted under 35 U.S.C. 154(b) by 476 days.

(21) Appl. No.: 09/887,836

(22) Filed: Jun. 22, 2001

(65) Prior Publication Data

US 2002/0015542 A1   Feb. 7, 2002

Related U.S. Application Data

(60) Provisional application No. 60/213,153, filed on Jun. 22, 2000.

(51) Int. Cl.
*B32B 9/04* (2006.01)
*B32B 27/40* (2006.01)

(52) U.S. Cl. .................. 428/411.1; 428/423.1; 428/480; 428/500; 428/34.7; 428/35.9; 428/36.6

(58) Field of Classification Search .......... 428/34.7, 428/35.7, 35.8, 35.9, 36.6, 480, 411.1, 423.1, 428/500
See application file for complete search history.

(56) References Cited

U.S. PATENT DOCUMENTS

| | | | | |
|---|---|---|---|---|
| 2,991,193 A * | 7/1961 | Fessler et al. | .............. | 428/335 |
| 3,415,764 A | 12/1968 | Erickson | ................... | 260/2.5 |
| 3,429,717 A | 2/1969 | Cook | ...................... | 99/171 |
| 4,041,209 A | 8/1977 | Scholle | ................... | 428/500 |
| 4,105,818 A | 8/1978 | Scholle | ................... | 428/192 |
| 4,107,362 A * | 8/1978 | Valyi | ...................... | 215/12.2 |
| 4,624,679 A | 11/1986 | McEntee | .................. | 8/650 |
| 4,650,847 A * | 3/1987 | Omura et al. | ............. | 526/376 |
| 4,702,966 A | 10/1987 | Farrell et al. | .............. | 428/500 |
| 4,784,906 A | 11/1988 | Akao | ...................... | 428/324 |
| 4,880,696 A * | 11/1989 | Yanidis | ................... | 428/349 |
| 4,885,119 A | 12/1989 | Mueller et al. | ............ | 264/22 |
| 5,055,328 A | 10/1991 | Evert et al. | ............... | 428/34.9 |
| 5,147,594 A | 9/1992 | Moffitt | .................... | 264/514 |
| 5,350,622 A | 9/1994 | Speer et al. | ............... | 428/215 |
| 5,382,391 A | 1/1995 | Juhl et al. | ................. | 264/22 |
| 5,529,833 A | 6/1996 | Speer et al. | ............... | 428/215 |
| 5,562,874 A * | 10/1996 | Saad et al. | ............... | 264/177.14 |
| 5,648,020 A | 7/1997 | Speer et al. | ............. | 252/188.28 |
| 5,700,554 A | 12/1997 | Speer et al. | ............... | 428/220 |
| 5,811,027 A | 9/1998 | Speer et al. | ............. | 252/188.28 |
| 5,945,145 A * | 8/1999 | Narsutis et al. | ............ | 426/123 |
| 6,194,061 B1 * | 2/2001 | Satoh et al. | ............... | 428/341 |

OTHER PUBLICATIONS

Hawley's Condensed Chemical Dictionary, 1997, John Wiley & Sons, Inc., Thirteenth Edition, p. 472.*

* cited by examiner

*Primary Examiner*—Harold Pyon
*Assistant Examiner*—Walter B Aughenbaugh
(74) *Attorney, Agent, or Firm*—Gifford, Krass, Groh, Sprinkle, Anderson & Citkowski, P.C.

(57) ABSTRACT

A packaging laminate includes an impermeable outer layer, an inner layer having a gas transmission rate greater than that of the outer layer, and an adhesive layer therebetween. The adhesive layer includes an adhesive resin, a curing agent and a butylated phenolic antioxidant. Migration of the butylated phenolic antioxidant through the laminate inner layer exposes a product stored in contact therewith to an antioxidant thereby decreasing the rate of product oxidation.

6 Claims, No Drawings

LAMINATE ANTIOXIDANT FILM

RELATED APPLICATION

This application claims priority of U. S. Provisional Patent Application 60/213,153 filed Jun. 22, 2000 and is incorporated herein by reference.

FIELD OF THE INVENTION

The present invention relates to packaging material, more particularly to a thin film layer in contact with an antioxidant adhesive and a method for application thereof.

BACKGROUND OF THE INVENTION

Packaging materials for foodstuffs, pharmaceuticals and air sensitive components can prolong the shelf life of such products with the inclusion of an antioxidant. A packaging material containing an antioxidant also must satisfy various material properties illustratively including moistureproofness; rigidity; light shielding; having a printable surface; sealability; flatness; slip characteristics; physical properties such as break strength, tear strength, impact puncture strength, wear resistance, and heat seal strength. In order to satisfy these various packaging material requirements, it is common to resort to a laminated film composition. Unfortunately, antioxidant species which are compatible with conventional packaging material compositions tend to be volatile organic molecules. As a result, under conditions necessary to extrude a packaging material laminate, antioxidants incorporated therein exhibit considerable volatility. The volatility of an antioxidant during extrusion not only inefficient but also creates volatile organic component (VOC) emissions. Thus, there exists a need for a packaging film laminate incorporating an antioxidant which is produced through a process that lessens antioxidant volatility.

SUMMARY OF THE INVENTION

A packaging laminate includes an impermeable outer layer, an inner layer having a gas transmission rate greater than that of the outer layer, and an adhesive layer therebetween. The adhesive layer includes an adhesive resin, a curing agent and a butylated phenolic antioxidant. Since the outer layer is impermeable to the butylated phenolic antioxidant, migration thereof is through the inner layer and thus into contact with a material stored in contact with the packaging laminate. Oxidation of a product sealed in a packaging laminate is less prone to oxidation.

A packaging laminate so described is formed by a process including the step of sandwiching a solventless adhesive material including an adhesive resin, curing agent and a butylated phenolic antioxidant between two thin film polymeric substrates.

DETAILED DESCRIPTION OF THE INVENTION

A packaging film laminate according to the present invention is designed to allow a substance contained within a package to be in fluid communication with an antioxidant. The antioxidant retarding the reaction of the product with oxygen in the presence of light, heat, and metal catalysts. As such, the flexible packaging material is at least semi-permeable to gases in contact with the package interior containing the product. Flexible packaging material exterior surface is selected to provide properties illustratively including moistureproofness, physical strength, printable surface finish, and a gas barrier.

The present invention utilizes an adhesive lamination process to apply an adhesive layer containing an antioxidant to the surface of a packaging material layer. The adhesive according to the present invention contains an adhesive resin illustratively including polyether urethanes, polyester urethanes, and polyurethanes. Preferably, the adhesive resin is polyester urethanes. An adhesive resin appropriate curing agent is also present within the adhesive and illustratively includes polyamines, polyols, isocyanates, and organometallics. Preferably, the curing agent is an aromatic or aliphatic isocyanate. An antioxidant is also present in the adhesive mixture. An antioxidant according to the present invention is a volatile organic illustratively including butylated phenols, butylated hydroquinones, and propyl gallate. Preferably, the antioxidant according to the present invention is a butylated phenol illustratively including butylated hydroxyanisole and butylated hydroxytoluene. It is appreciated that in addition to these antioxidants, nonvolatile antioxidants illustratively including Vitamin E, citric acid, ascorbic acid and ascorbyl palmitate are added to the adhesive material. It is further appreciated that additives are optionally present within adhesive material, these additives illustratively including plasticizer, pigment, filler and solvent.

Preferably, the adhesive material according to the present invention lacks a solvent. The adhesive material is prepared by mixing together the adhesive resin, curing agent and antioxidant, as well as optional additives using a meter-mix-dispensing unit or alternatively the antioxidant is premixed into a curing agent formulation which is in turn combined with the adhesive resin component. A butylated phenolic antioxidant being present in a concentration of between 1,000 and 300,000 parts per million. The adhesive material mixture is pumped onto a coating station of a laminating machine, with metering rolls on the coating station transferring the adhesive material evenly onto a thin film substrate. The adhesive mixture being applied from about $5 \times 10^{-5} - 1 \times 10^{-3}$ dry pounds per square foot of substrate. Preferably, the adhesive material is applied at between 1 and $10 \times 10^{-4}$ pounds per square foot of substrate. More preferably, the adhesive material is applied at between 2.5 and $7 \times 10^{-4}$ pounds per square foot. The adhesive lamination process according to the present invention is practiced at temperatures well below the boiling point of the antioxidant and ideally remain below 400° F. Preferably, adhesive lamination is conducted at temperatures between about 50° F. and 300° F. More preferably, the process is conducted at between 50° F. and 200° F. Still more preferably, the process is conducted at between 70° F. and 150° F. Most preferably, the process is conducted between 90° F. and 125° F. resulting in negligible loss of antioxidant through volatilization and enhanced spreadability.

A thin film substrate according to the present invention includes a flexible layer of any material used in forming packaging film laminate. An outer layer of a packaging laminate according to the present invention is characterized by being impermeable. "Impermeable" as used herein is defined to mean having a vapor transmission rate at 70° F. of less than 0.80 grams per 100 square inches per 24 hours. An outer layer substrate according to the present invention includes polyvinylidene chloride (PVDC) coated polyester, PVDC coated polypropylene, aluminum coated polyethylene terephthalate (PET), polyethylene (PE), oriented polypropylene (OPP), nylon, aluminum oxide coated PET, aluminum oxide coated polyester, acrylic coated polypropylene and PET, layers thereof, coatings thereof, and combinations thereof. Preferably, the outer layer has a thickness of between 0.05 and 2 mils. More preferably, the adhesive material is applied to a surface of the outer layer to form a laminate having a slippery outer layer surface and an exposed adhesive surface. In one embodiment of the present invention, the adhesive surface is overlayered with a thin film substrate adapted to form an inner layer of a flexible packaging laminate. The inner layer is a polymeric material having a higher vapor transmission rate than the outer layer. Preferably, the vapor transmission rate of the inner polymer layer is greater than 0.80 grams per 100 square inches per 24 hours at 70° F. The inner polymer layer illustratively includes polyethylene, polypropylene, open cell layers thereof, mixtures thereof, and block copolymers thereof. Upon sandwiching the adhesive between inner and outer layers, the resulting packaging laminate is processed to form a packaging unit. The permeability of the inner layer allows air trapped within a sealed packaging unit to come into fluid communication with the antioxidant contained within the cured adhesive layer. The reaction of oxygen with the antioxidant thereby retards the action between a product sealed within the packaging unit and oxygen.

In another embodiment of the present invention, the adhesive material disposed on a thin film substrate is brought into contact with a peelable removable backing layer. Removal of the backing layer thereby forming a pressure adhesive tape or film having utility as an alternative to heat sealing of a packaging unit. An adhesive seal according to the present invention offers advantages over heat sealing including resealability and lower gas pressure within a sealed packaging unit. Peelably removable backing layers according to the present invention illustratively include a film substrate coated with a release polymer illustratively including wax, polypropylene, or silicone. Preferably, the film substrate is a calendered paper.

In order to more fully demonstrate the advantages of the present invention, the following examples are set forth. It is to be understood that the following is by way of example only and not intended as a limitation on the scope of the invention.

EXAMPLE 1

Sample 1

A flexible packaging material is prepared by adhesive laminating aluminum oxide coated polyester (outer impermeable layer) to high density polyethylene (HDPE) (inner semipermeable layer) with a butylated hydroxytoluene (BHT) containing adhesive. The amount of BHT added to the adhesive is approximately 23,500 PPM. The outer impermeable layer is 0.48 mils thick and the inner semipermeable layer is 1.15 mils thick.

Sample 2

A second flexible packaging material is prepared by adhesive laminating aluminum oxide coated polyester (outer impermeable layer) to oriented polypropylene (inner semipermeable layer) with a butylated hydroxytoluene (BHT) containing adhesive. The amount of BHT added to the adhesive is approximately 23,500 PPM. The outer impermeable layer is 0.48 mils thick and the inner semipermeable layer is 0.70 mils thick.

Sample 3

A third flexible packaging material is prepared by adhesive laminating metalized polyester (outer impermeable layer) to linear low density polyethylene (inner semipermeable layer) with a butylated hydroxytoluene (BHG) containing adhesive. The amount of BHT added to the adhesive is again approximately 23,500 PPM. The outer impermeable layer is 0.48 mils thick and the inner semipermeable layer is 2.0 mils thick.

Forty-two pouches of each sample type are produced to the dimensions 6.25"×10.375" (64.844 in$^2$). Fifteen grams of processed (cooked) rice is loaded into each pouch and sealed closed. Half of the pouches are placed in a "hot" room at 100° F., 35% relative humidity (RH) the other half are kept at ambient conditions 70° F., 35% RH. Pouches are pulled at various intervals and product (rice) is tested for evidence of BHT. Results of this analysis are shown in Table I and Table II.

TABLE I

Room Temperature

| Days | Sample 1 (ppm BHT) | Sample 2 (ppm BHT) | Sample 3 (ppm BHT) |
| --- | --- | --- | --- |
| 0 | 0.00 | 0.00 | 0.00 |
| 3 | 14.80 | 5.57 | 11.63 |
| 12 | 19.97 | 6.50 | 9.57 |
| 18 | 21.67 | 8.00 | 10.30 |
| 24 | 24.37 | 10.93 | 9.77 |
| 38 | 25.60 | 10.67 | 11.87 |
| 52 | 27.07 | 10.87 | 11.00 |

1 ppm = 0.000015 grams

TABLE II

Hot Room

| Days | Sample 1 (ppm BHT) | Sample 2 (ppm BHT) | Sample 3 (ppm BHT) |
| --- | --- | --- | --- |
| 0 | 0.00 | 0.00 | 0.00 |
| 3 | 14.80 | 5.57 | 11.63 |
| 12 | 28.43 | 20.73 | 10.80 |
| 18 | 24.53 | 9.93 | 18.83 |
| 24 | 25.13 | 10.27 | 19.77 |
| 38 | 30.03 | 22.30 | 10.73 |
| 52 | 27.03 | 20.27 | 10.53 |

1 ppm = 0.000015 grams

Example 2

In order to test the comparative migration of the antioxidant BHT from a pouch into a quantity of cooked rice contained therein, parallel experiments were run over a period of six weeks at 35% relative humidity for pouches stored at 70° F. and 100° F. The size and contents of the pouches are as described in Example 1. The composition of the pouches for this study are summarized in Table III. Sample #4, which is used as a control, is a conventional liner material produced by blown film process.

TABLE III

Sample Pouch Structure

| Sample | Inner Layer | Intermediate Layer | Outer Layer |
| --- | --- | --- | --- |
| 4 (control) | sealant with BHT 70 gauge OPP | HDPE | HDPE |
| 5 | | adhesive & BHT (32,000 ppm) | 48 gauge aluminum oxide coated PET |

TABLE III-continued

Sample Pouch Structure

| Sample | Inner Layer | Intermediate Layer | Outer Layer |
|---|---|---|---|
| 6 | 70 gauge OPP | adhesive & BHT (60,000 ppm) | 48 gauge aluminum oxide coated PET |
| 7 | 70 gauge OPP | adhesive & BHT (77,500 ppm) | 48 gauge aluminum oxide coated PET |
| 8 | 115 gauge OPP | adhesive & BHT (77,500 ppm) | 48 gauge aluminum oxide coated PET |

Chemical analysis for BHT is conducted on a rice product initially and after one, two, four and six weeks of room temperature (70° F.) and hot room (100° F.) storage. The amount of BHT that migrated into the rice product is provided in Table IV.

TABLE IV

BHT Data (ppm)

| Storage Conditions | Test Point | Sample #4 Control | Sample #5 | Sample #6 | Sample #7 | Sample #8 |
|---|---|---|---|---|---|---|
| 70° F. 35% RH | Initial | 14.0 | 4.7 | 7.4 | 9.0 | 28.0 |
| | | 14.7 | 4.4 | 7.4 | 9.7 | 31.1 |
| | | 11.4 | 4.2 | 9.2 | 8.5 | 22.4 |
| | 1 week | 15.3 | 4.3 | 9.2 | 10.5 | 39.0 |
| | | 16.3 | 5.2 | 9.4 | 9.8 | 40.5 |
| | | 14.5 | 4.7 | 9.5 | 10.1 | 48.7 |
| | 2 weeks | 14.4 | 6.0 | 10.2 | 10.2 | 48.7 |
| | | 15.8 | 5.7 | 11.6 | 11.6 | 41.5 |
| | | 14.6 | 6.4 | 11.6 | 11.8 | 42.7 |
| | 4 weeks | 13.2 | 7.7 | 14.3 | 13.3 | 56.6 |
| | | 13.4 | 6.5 | 13.9 | 15.2 | 45.0 |
| | | 13.3 | 7.3 | 14.1 | 15.0 | 46.9 |
| | 6 weeks | 13.5 | 8.3 | 16.4 | 17.7 | 64.1 |
| | | 13.1 | 8.8 | 14.9 | 14.7 | 58.9 |
| | | 14.0 | 7.1 | 14.4 | 17.7 | 54.7 |
| 100° F. 35% RH | Initial | 14.0 | 4.7 | 7.4 | 9.0 | 28.0 |
| | | 14.7 | 4.4 | 7.4 | 9.7 | 31.1 |
| | | 11.4 | 4.2 | 9.2 | 8.5 | 22.4 |
| | 1 week | 10.7 | 19.9 | 28.2 | 33.3 | 62.9 |
| | | 10.5 | 18.4 | 25.7 | 39.1 | 51.6 |
| | | 10.6 | 20.1 | 32.6 | 25.5 | 65.3 |
| | 2 weeks | 9.6 | 23.6 | 36.8 | 40.8 | 60.0 |
| | | 9.5 | 23.2 | 39.8 | 43.5 | 59.9 |
| | | 7.7 | 20.2 | 40.0 | 41.8 | 61.3 |
| | 4 weeks | 3.3 | 23.7 | 46.2 | 45.6 | 64.3 |
| | | 2.8 | 23.9 | 41.0 | 45.2 | 64.7 |
| | | 4.3 | 25.2 | 44.0 | 44.2 | 58.8 |
| | 6 weeks | 1.2 | 26.5 | 44.1 | 44.9 | 65.1 |
| | | 1.9 | 26.0 | 46.1 | 45.3 | 61.6 |
| | | 1.6 | 27.9 | 44.9 | 47.9 | 62.8 |

One skilled in the art will readily appreciate that the present invention is well adapted to carry out the objectives and obtain the advantages mentioned as well as those inherent therein. Changes therein and other uses will occur to those skilled in the art which are encompassed within the spirit of the invention as defined by the scope of the appended claims. The following claims, including all equivalents thereof, are intended to define the scope of the invention.

The invention claimed is:

1. A packaging laminate comprising an outer layer impermeable to a butylated phenolic antioxidant; an adhesive layer between said outer layer and an inner layer and in contact with both said outer layer and said inner layer to form said packaging laminate, wherein said adhesive layer comprises an adhesive resin, a curing agent and said butylated phenolic antioxidant; and said inner layer allowing migration of said butylated phenolic antioxidant therethrough.

2. The packaging laminate of claim 1 wherein the outer layer is selected from a group consisting of: polyvinylidene chloride (PVDC) coated polyester, PVDC coated polypropylene, aluminum coated polyethylene terephthalate (PET), polyethylene (PE), oriented polypropylene (OPP), nylon, aluminum oxide coated PET, aluminum oxide coated polyester, acrylic coated polypropylene and PET, layers thereof, coatings thereof, and combinations thereof.

3. The packaging laminate of claim 1 wherein said adhesive resin is selected from a group consisting of: polyether urethanes, polyester urethanes, and polyurethane.

4. The packaging laminate of claim 1 wherein said curing agent is selected from a group consisting of: polyamines, polyols, isocyanates, and organometallics.

5. The packaging laminate of claim 1 wherein said butylated phenolic antioxidant is selected from a group consisting of butylated hydroxytoluene and butylated hydroxyanisole.

6. An antioxidant adhesive film formed by the process comprising the step of: applying a solventless cured adhesive resin selected from the group consisting of: polyether urethanes, polyester urethanes, and polyurethane; and a butylated phenolic antioxidant present in a concentration of between 1000 and 300,000 parts per million from 0.00005 to 0.001 dry pounds per square foot on a substrate.

* * * * *